United States Patent [19]

Richlin

[11] 4,108,671

[45] Aug. 22, 1978

[54] DYE-BASED INKS WITH IMPROVED VEHICLES

[76] Inventor: Milton Richlin, 6416 Dorcas St., Philadelphia, Pa. 19111

[21] Appl. No.: 676,047

[22] Filed: Apr. 12, 1976

[51] Int. Cl.² ............................................... C09D 11/00
[52] U.S. Cl. ........................................ 106/22; 106/23; 106/28
[58] Field of Search ........................ 106/19, 20, 22, 23, 106/27, 31, 32, 308 Q; 260/404.8

[56] References Cited

U.S. PATENT DOCUMENTS

| | | | |
|---|---|---|---|
| 1,562,544 | 11/1925 | Cunningham | 106/20 |
| 3,129,104 | 4/1964 | Callinan et al. | 106/32 X |
| 3,933,512 | 1/1976 | Heintzelman et al. | 106/22 |

FOREIGN PATENT DOCUMENTS

| | | | |
|---|---|---|---|
| 1,206,534 | 9/1970 | United Kingdom | 106/22 |
| 424,628 | 2/1935 | United Kingdom | 16/22 |

*Primary Examiner*—Joan E. Welcome
*Attorney, Agent, or Firm*—Miller & Prestia

[57] ABSTRACT

Dye-based inks include an improved organic vehicle consisting of the monoester of a dicarboxylic acid or anhydride with a monohydric or polyhydric alcohol. Because of the multiplicity of functional groups on the molecule, these vehicles show solvency characteristics for a wide variety of dye structures, including basic dyes, basic dye bases, and oil-soluble dyes.

7 Claims, No Drawings

DYE-BASED INKS WITH IMPROVED VEHICLES

This invention pertains to improved dye vehicles for various applications, and specifically to ink compositions containing improved organic vehicles as solvents for basic dyes, basic dye bases and oil-soluble dyes. The inks specified for purposes of this patent include typewriter and printer ribbon inks of all types, ball point pen inks, sheet carbon inks both wax-based and resin-based, and inks formulated for impregnation into porous elastomeric materials such as stamp pad bases and rollers for the inking of printing mechanisms. All of these inks have in common the utilization of non-volatile organic vehicles as the binder compositions.

For an understanding of the inks described in the specifications, a brief review of the solubility characteristics of the commonly-used ink dyes follows.

Basic Dyes - Usually hydrochlorides or oxalates of color bases of the azo, azine, xanthene, oxazine, thiozine, ketonimine, acridine, triphenylmethane and diphenylnaphthylmethane groups of dyes. These dyes are soluble in varying degrees in monohydric and polyhydric alcohols, as well as in water. Typical dyes in this group include nigrosine SSB, Bismarck Brown Y, Methyl Violet concentrate, Victoria Pure Blue BO, Rhodamine B, Spirit Black and Crystal Violet APN.

Basic Dye Bases — These are basic dyes in which the chloride or oxalate has been neutralized with caustic. They are soluble in vehicles containing the carboxylic acid group, principally the fatty acids such as oleic, stearic and lauric acids. Typical dyes of this group are nigrosine base, Victoria Blue Base, Methyl Violet Base, Induline Base, and Rhodamine B Base.

Oil-Soluble Dyes — These are often referred to as Sudan dyes, and are of the azo type. They are soluble in natural and synthetic esters, and in certain aromatic oils. Sudan Deep Black BB, Sudan Blue II and Sudan Red 7B-- all BASF[1] dyes—are typical examples. These dyes are considered permanent in light-fastness. The basic dyes and basic dye bases are fugitive colors.

[1]BASF Wyandotte Corp., Pigments & Dyes Div., Parsippany, NJ

Typewriter ribbon inks referred to as "single color" inks and printer ribbon inks for computer printouts include in their composition basic dye bases, a fatty acid vehicle, and a carrier which is usually a mineral oil or a non-volatile ester. The primary fatty acid vehicle used in such inks is oleic acid. It is of low viscosity and has excellent solvency for basic dye bases, producing inks of good color denisty and durability. However, this prior art vehicle has certain disadvantages and limitations. Because of its low viscosity and excellent wetting properties, it tends to produce a certain amount of dye bleed in the ink, with a consequent reduction of the quality of the type character, both from legibility and appearance standpoints. Where the typed copy is subsequently used in Optical Character Recognition (OCR) readout applications, the dye bleed problem may interfere with the OCR readout.

The use of basic dyes or oil-soluble dyes in the single color ink is limited by the poor solvency of the oleic acid for these dyes. Where, for example, a certain amount of a Sudan black dye can be incorporated and dissolved by the ester co-vehicle of the ink, the stability of the ink may be impaired because of the limited compatibility of the dye and the oleic acid, which is the major component. Similarly, basic dyes depend on glycols or glycerol-type vehicles for their solubility, and these vehicles have limited compatibility with oleic acid; their use, therefore, would limit the stability of the ink system.

Bichrome, or two-color typewriter ribbons, such as black-and-red or blue-and-red, require inks which do not bleed appreciably into each other across the color division. While it would be advantageous to use dyes such as the basic dye bases for enhancement of color and durability of the ink, these cannot be used except in a very minor way, because of the bleeding characteristics of the oleic acid solvent. Basic dyes and oil-soluble dyes have not been widely used because of compatibility problems of the dye solvents and other ink vehicles.

Inked rollers for re-inking of terminal printers and other printing mechanisms require generally non-pigmented ink system. Because of the fine pore structure of these rollers, as typified by "Porelon"[2] and "Micro-Well"[3] elastomeric bases, pigments have a tendency to clog the pores and filter out from the ink. To provide the lightfastness and archival quality required for these inks and normally supplied by the pigment, the Sudan dyes are effective.

[2]Porelon, Inc., Racine, Wis.
[3]Microwell, Inc., Miamisburg, Ohio 45342

The nature of the re-inking devices requires an ink of low or no thixotropy and moderate fluidity. Oleic acid inks containing basic dye bases are widely used in this application. However, the incorporation of the oil-soluble Sudan dye is limited because of the reduced solvency for and compatibility of the oleic acid with these dyes.

Wax-based sheet carbon inks usually contain a small amount of a basic dye base for improved color density and durability. The dye increment is limited by the amount that can be dissolved by the carnauba or other ester waxes present, and by the oleic acid in the formula. Only a very minor amount of oleic acid can be used; otherwise, some softening of the ink composition may occur with consequent smudging and dye bleed of the typed print. The liquid binder normally used in wax carbon inks is mineral oil. This is a non-solvent for oil-soluble and basic dyes, and therefore these dyes cannot be used for color or durability improvement.

Resinous, or "solvent coated" inks for use in polyester-based multiple use sheet carbon and printer ribbon applications, are generally not formulated with basic dye bases and/or oil-soluble dyes because the oleic acid and ester solvents for these dyes would provide excessive plasticization and softening of the resinous ink-carrying matrix. Additionally, combinations of these dyes and of their solvents might produce instability in the ink system.

Still further, the limitations of prior art vehicles are apparent in the compositions of ball point inks. Because of the universal use of ball point pens in all types of official and legal documents, the inks must have archival qualities. The use of pigments would cause clogging of the pen tip; it is therefore necessary to use permanent dyes such as the Sudan dyes produced by BASF or Iosol dyes produced by Allied Chemical[4] or similar dyes. Basic dye bases, which produce the most brilliant and intense shades of any of the ink dyes, can be used in only a minor way because the oleic acid solvent is not a good solvent for the permanent dyes, and its use may cause problems of ink instability.

[4]Allied Chemical Corp., Specialty Chemicals Div., Morristown, NJ 07960

It is therefore a general object of the present invention to provide improved dye-based inks with vehicles capable of developing a full dye potential through solubilization of a multiplicity of dye structures, while minimizing dye bleed.

A more specific object of this invention is to provide single-color and printer ribbon inks with an improved vehicle capable of solubilizing basic dye bases and oil-soluble dyes with maximum ink stability and minimum dye bleed for OCR applications.

A further object of this invention is to provide bichrome ribbon inks with an improved vehicle of controlled viscosity, and capable of solubilizing all three classes of dyes described earlier in the specifications, with maximum print density and ribbon durability and with minimum dye bleed across the bichrome division.

A further object of this invention is to provide inks for stamp pads and inked rollers with an improved vehicle capable of developing the full dye strength of both permanent and fugitive dye classes, and of tailored viscosity to control the fluidity characteristics of the ink in the elastomeric base.

A further object of this invention is to provide wax-based multiple-use sheet carbon inks with an improved vehicle, either liquid or solid, capable of incorporating larger amounts of dyes than is possible with prior art inks, and of maintaining a controlled plasticizing effect on the carnauba or other ester-wax component.

A further object of this invention is to provide resinous inks for polyester-based multiple use sheet carbon and printer ribbon applications, with an improved vehicle capable of incorporating larger quantities of the various classes of dye structures, and of maintaining a controlled plasticizing effect on the resinous ink-carrying matrix.

A further object of this invention is to provide ball point inks with an improved vehicle capable of developing the full dye strength of both permanent and fugitive dye classes, and of tailored viscosity to control the flow of the ink through the ball point mechanism.

These and other objects, which will be apparent from the following description of this invention, are met, briefly, by dye-based inks in which the vehicle consists of a monester of a dicarboxylic acid radical.

Preferably, the dicarboxylic acid radical is that of an alkyl dicarboxylic acid or anhydride having two or more carbon atoms between the carboxy groups, or an aryl dicarboxylic acid or anhydride, and the monoester thereof is produced by reaction with a monohydric alcohol having one or more carbon atoms, or with a di- or polyhydric alcohol.

For better understanding of this invention, reference is made to the following detailed description thereof and the appended claims.

An improved dye-based single color or bichrome black ink for typewriter or computer printer ribbons can be formulated with basic dye bases, oil soluble dyes, and basic dyes, such as nigrosine base, methyl violet base, Sudan oil-soluble black BB, nigrosine SSB or Victoria Blue BOC.

These dyes, in accordance with the present invention, are incorporated in an ink with an improved organic vehicle consisting of a monoester of a di-acid radical of an acid or anhydride preferably from but not limited to the following groups:

Simple Aliphatic Acids oxalic acid
malonic acid
succinic acid
maleic acid
fumaric acid
glutaric acid
adipic acid
pimelic acid
suberic acid
azelaic acid
sebacic acid
octenyl succinic acid
nonenyl succinic acid
dodecenyl succinic acid

Aromatic Acids o-phthalic acid
p-phthalic acid
tetrahydrophthalic acid
hexahydrophthalic acid
methylbicyclo-[2,2,1] hept-5-ene-2,3-dicarboxylic anhydride (Methyl Anhydride[5])

[5]Trade name of Allied Chemical Corp., Specialty Chemicals Div.

The monoesters of these dicarboxylic acids may be synthesized by controlled esterification of the acid or anhydride form of these acids, by combination with a monohydric or polyhydric alcohol, preferably from one of the following groups:

Simple Monohydric Alcohols

Any straight chain or branched aliphatic, cycloaliphatic or aromatic alcohol with a minimum of one carbon atoms, such as methanol.

Simple Polyhydric Alcohols ethylene glycol
propylene glycol
butanediol
pentanediol
hexanediol
glycerol

Monohydric Ether Alcohols 2-methoxy ethanol (Methyl Cellosolve)
2-ethoxy ethanol (Cellosolve)[6]
2-butoxy ethanol (Butyl Cellosolve)
1,2-diethoxy ethanol (Carbitol)[6]
1,2-dibutoxy ethanol (Butyl Carbitol)
1,2-dimethoxy ethanol (Methyl Carbitol)

[6]Trade names of Union Carbide Corporation, 270 Park Ave., New York, NY 10017.

Polyhydric Ether Alcohols diethylene glycol
triethylene glycol
polyethylene glycols 200 through 600

Miscellaneous Monohydric Alcohols tetrahydrofurfuryl alcohol

In general, the improved organic vehicles for dye-based inks of the present invention comprise compounds of the following molecular structure:

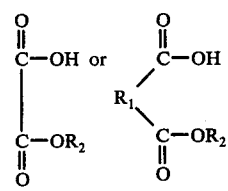

where $R_1$ is any alkyl, alkenyl or aryl group and $R_2$ is an ester moiety from the group consisting of alkyl, alkenyl or aryl group, with a minimum of one carbon atoms, and which may include one or more substituents from the group consisting of —(OH), and —(O),.

Improved organic vehicles within the foregoing definition and within the scope of the present invention may be either solid or liquid depending on the application, and liquid at normal temperatures for hot-melt wax sheet carbon inks, about 160° F and above. Further, such vehicles are preferably low in volatility, as this term is normally used to describe vehicles for typewriter ribbon applications.

Among the monoester compounds within the scope of the present invention which have been prepared are the following:

monobenzyl nonenylsuccinate
mono - 1, 2 dibutoxy ethyl maleate
monononyl phenyl octenyl succinate
mono - n - butyl azelate
mono - 1, 2 diethyoxy ethyl succinate
mono - n - butyl ester of methyl anhydride
mono - n - butyl hexahydrophthalate
mono - 1, 2, diethoxy ethyl hexahydrophthalate
mono - 1, 2, diethoxy ethyl ester of methyl anhydride
monoester of triethylene glycol and methyl anhydride,
monoester of triethylene glycol and hexahydrophthalic anhydride,
monoester of triethylene glycol and succinic anhydride
mono - 1, 4 butanediol maleate
mono - tetrahydrofurfuryl phthalate
mono - methylamyl octenyl succinate.

Of the foregoing, the following are water-miscible and are preferred for use with basic dyes:

monoester of triethylene glycol and methyl anhydride,
monoester of triethylene glycol and hexahydrophthalic anhydride,
monoester of 1, 4 butanediol and maleic anhydride,
monoester of triethylene glycol and succinic anhydride Of the foregoing, the following are preferred for use with basic dye bases and oil-soluble dyes:

mono - n - butyl ester of methyl ahydride
mono - 1, 2, diethoxy ethyl hexahydrophthalate
mono - 1, 2, diethoxy ethyl ester of methyl anhydride
mono - 1, 2, diethoxy ethyl succinate
mono - n butyl azelate.

Particular ink combinations which have been made in accordance with the foregoing include the following:

An improved dye-based single color ink of the following composition:

Induline Base N 7.4%
Oil Soluble Black BB (BASF) 6.7%
Methyl Violet Base 4.4%
Monoester of octenyl succinic anhydride and methyl isobutyl carbinol 56.7%
Di-Octyl Phthalate 24.8%
(Ink viscosity was 1200 cp.)

The ink contains no pigment and is prepared simply by wetting the dyes first in a volatile solvent such a toluol, then adding the monoester with stirring and heating to about 160° - 180° F to drive off the solvent. The ink, when inked on a one-half inch wide nylon ribbon cloth of 4-mil caliper, showed improved sharpness of print and reduced bleed into the copy paper, in comparison to a conventional black record ribbon similarly prepared.

An improved dye-based bichrome black ink can be formulated with a combination of basic dye bases, oil-soluble dyes and basic dyes. A typical formula, containing pigment for controlled flow and thixotropy characteristics, is given below:

Induline Base N; 4%
Oil Soluble Black BB; 2
n-butyl mono nonenyl succinate 18
Raven 1255 Black[7]; 12
7MB-258 Alkali Blue Paste[8]; 6
lard oil; 18
castor oil; 50
Ink viscosity = 6000 cp.

[7]Cities Service, Columbian Div., 3200 W. Market St., Akron, Ohio 44313
[8]Chemetron Corp., Pigments Div., 491 Columbia Ave., Holland, Mich. 49423

The ink, when inked on a one-half inch wide nylon ribbon cloth of 4-mil caliper alongside a conventional bichrome red ink, showed improved print color density and durability, versus a conventional bichrome ribbon similarly prepared to the same ink percentage, with commercially acceptable bleed across the bichrome division.

In general, excellent dye opening (developing dye to its full color potential) is observed with the monoester organic vehicle of the present invention and excellent compatibility is established between these ink vehicles and resinous carriers, such as those in use in polyester typewriter ribbon materials.

In addition, inks based on the vehicles of the prsent invention may also be used for inked roller and stamp pad applications, and in the ball-point pen field.

The key characteristic which distinguishes the monoester vehicles of the present invention from prior art vehicles is the multifunctionality of their dye solvency capabilities. No commercially available prior art vehicle can dissolve both basic dye bases and oil soluble dyes. The monoester vehicles containing carboxy and ester moieties can dissolve dyes in both groups. Those containing the above functional groups and additionally, hydroxyl moieties, can additionally dissolve basic dyes.

The following are examples of the synthesis of four different monoesters of dye functional carboxylic acids in accordance with the present invention.

EXAMPLE 1

Preparation of Monobenzyl nonenyl Succinate

Two hundred and twenty-four grams (1 mol) of nonenyl succinic anhydride and 108 grams (1 mol) of benzyl alcohol were weighed into a 500 ml. round-bottom flask fitted with a thermometer and reflux condenser. The mixture was heated by means of a heating mantle to 150° C and stirred with a magnetic stirrer. Temperature was maintained for one half hour, and the reaction product allowed to cool. The monoester was a viscous liquid, 2700 - 3000 centipoise, and 168 acid value.

EXAMPLE 2

Preparation of Mono 1, 5 - Pentanediol Maleate

Ninety-eight grams (1 mol) of maleic anhydride were weighed into a 500 ml. round-bottom flask fitted with a separatory funnel, thermometer and reflux condenser. One hundred and two grams (1 mol) of 1, 5 - pentanediol were introduced into the separatory funnel. The maleic anhydride was heated to 140° C by means of a heating mantle and the pentanediol was added dropwise over a period of 60 minutes. The reactants were stirred with a magnetic stirrer. The temperature was raised gradually to 160° C. After the addition of the pentanediol was complete, the mixtures was heated an additional 30 minutes, then allowed to cool. The monoester was a moderately viscous liquid of 1400 – 1500 centipoise and an acid value of 216.

EXAMPLE 3

Preparation of Monomethylamyl Octenyl Succinate

Two hundred and ten grams (1 mol) of octenyl succinic anhydride were weighed into a 500 ml. round-bottom flask fitted with a separatory funnel, thermometer and a reflux condenser. One hundred and two grams (1 mol) of methyl amyl alcohol were introduced into the separatory funnel. The octenyl succinic anhydride was heated to 140° C by means of a heating mantle and the methyl amyl alcohol was added dropwise over a period of 60 minutes. The reactants were stirred with a magnetic stirrer and the temperature maintained at 140° C. After the addition of the alcohol was complete, the mixture was heated an additional 30 minutes, then allowed to cool. The monoester was a fluid liquid of 100 centipoise, and an acid value of 189.

While I do not wish to be bound to any particular theory or explanation of the excellent qualities of inks based on vehicles in accordance with the present invention, it does appear that the multifunctionality of the monoester compounds provides dye-solubilizing chemical groups which functionally, or perhaps chemically, combine with the various types of dyes classified earlier, and that the presence of these groups within one molecular structure provides the stability and compatibility not normally present in mixtures of dyes and organic vehicles.

Because of the very large number of combinations of difunctional and tri- and poly-functional monoesters which are possible theoretically and readily available synthetically, it is possible to tailor the monoester vehicle to the end application, from the standpoints of dye solvency, acid number, viscosity, non-volatility, water-miscibility, and plasticizing characteristics.

While this invention has been described with reference to specific embodiments and examples, it should be understood that it is not limited thereto and that the appended claims are intended to be construed to cover not only the embodiments, specific compositions and examples set forth above, but also substantially equivalent modifications and variations thereof and all such forms of the present invention which will be apparent to those skilled in the art and which may be made by those skilled in the art without departing from the true spirit and scope thereof.

I claim:

1. In an ink consisting of a dye and an improved vehicle therefor, the improvement consisting of an improved organic vehicle composed of compounds having the following molecular structure:

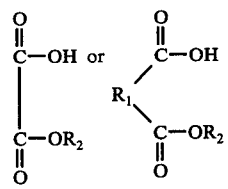

where $R_1$ is an alkyl, alkenyl or aryl group and $R_2$ is an ester moiety from the group consisting of alkyl, alkenyl or aryl group, with a minimum of one carbon atom, and which may include one or more substituents from the group consisting of —(OH), and —(O).

2. Ink with improved organic vehicle, as recited in claim 1, wherein $R_2$ includes from 1 to 3 substituents from the group consisting of —OH, and —O—.

3. Ink with improved organic vehicle, as recited in claim 1, wherein said dye is a basic dye base wherein the chloride or oxalate of the basic dye has been neutralized with caustic and the basic dye comprises a member from the group consisting of hydrochlorides or oxalates of azo, azine, xanthene, oxazine, thiozine, ketonimine, acridine, triphenylmethane and diphenylnaphthylmethane color bases.

4. Ink with improved organic vehicle, as recited in claim 1, wherein said dye is a basic dye from the group consisting of hydrochlorides or oxalates of azo, azine, xanthene, oxazine, thiozine, ketonimine, acridine, triphenylmethane and diphenylnaphthylmethane color bases.

5. Ink with improved organic vehicle, as recited in claim 1, wherein said dye is an oil-soluble dye of the azo type.

6. Ink with improved organic vehicle, said ink also including a dye and said improved organic vehicle consisting of a monoester of a diacid radical of an acid from the group consisting of:
 maleic acid
 fumaric acid
 malonic acid
 succinic acid
 glutaric acid
 adipic acid
 pimelic acid
 suberic acid
 azelaic acid
 sebacic acid
 octenyl succinic acid
 nonenyl succinic acid
 dodecenyl succinic acid
 phthalic acid
 hexahydrophthalic acid
 tetrahydrophthalic acid
 methyl bicyclo [2,2,1] hept-5-ene-2,3-dicarboxylic acid, the ester moiety of said half ester consisting of an alkyl, alkenyl or aryl group, with a minimum of one carbon atom, which ester moiety may include one or more substituents from the group consisting of —(OH) and —(O).

7. Ink with improved organic vehicle, as recited in claim 1, wherein said $R_2$ is a radical derived from an ester-forming compound from one of the following group or its isomers:
 methanol
 ethanol
 propanol
 butanol pentanol
hexanol
2-ethyl hexanol
heptanol
octanol
nonanol
decanol
tridecanol
methyl isobutyl carbinol
tetrahydrofurfuryl alcohol
ethylene glycol
propylene glycol
butanediol
pentanediol
glycerol
diethylene glycol
triethylene glycol
polyethylene glycol
benzyl alcohol
2-methoxy ethanol
2-ethoxy ethanol
2-butoxyethanol
1,2-dimethoxy ethanol
1,2-diethoxy ethanol
1,2-dibutoxy ethanol
cyclohexyl alcohol.

* * * * *